Oct. 26, 1926.
W. W. WEIR
COOKING RANGE
Original Filed Dec. 20, 1923    4 Sheets-Sheet 3
1,604,433
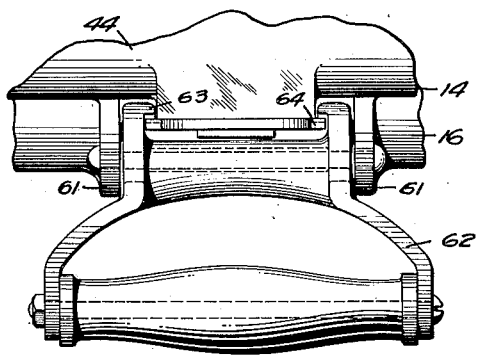
FIG. 4.
FIG. 3.
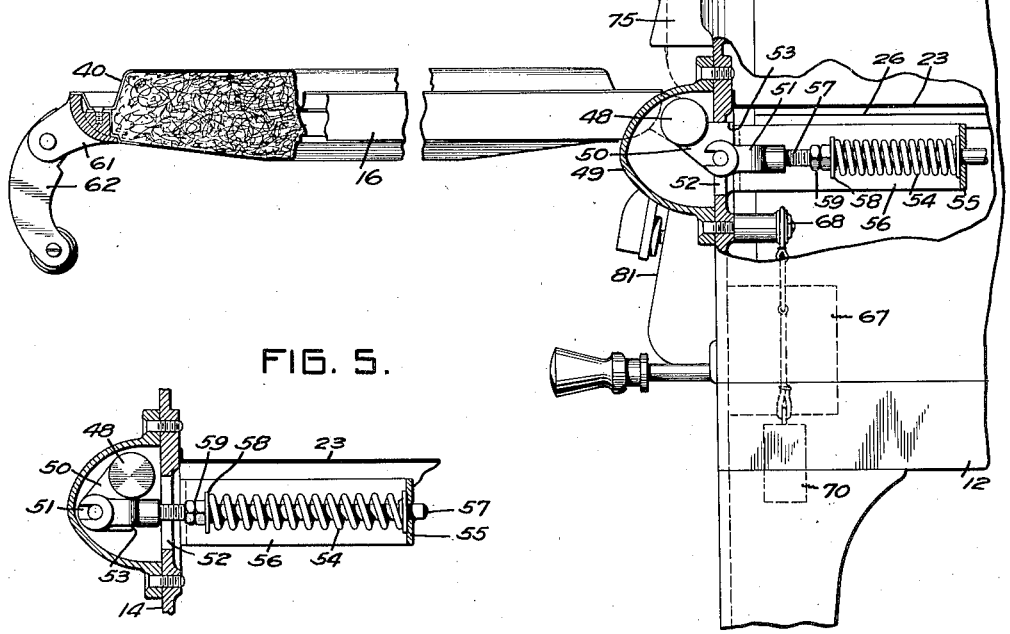
FIG. 5.
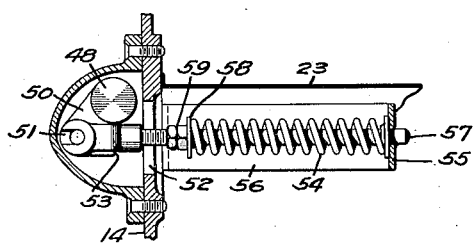
INVENTOR
William W. Weir
BY
White Prost Evans
his ATTORNEYS
Witness:
H. Sherburne.

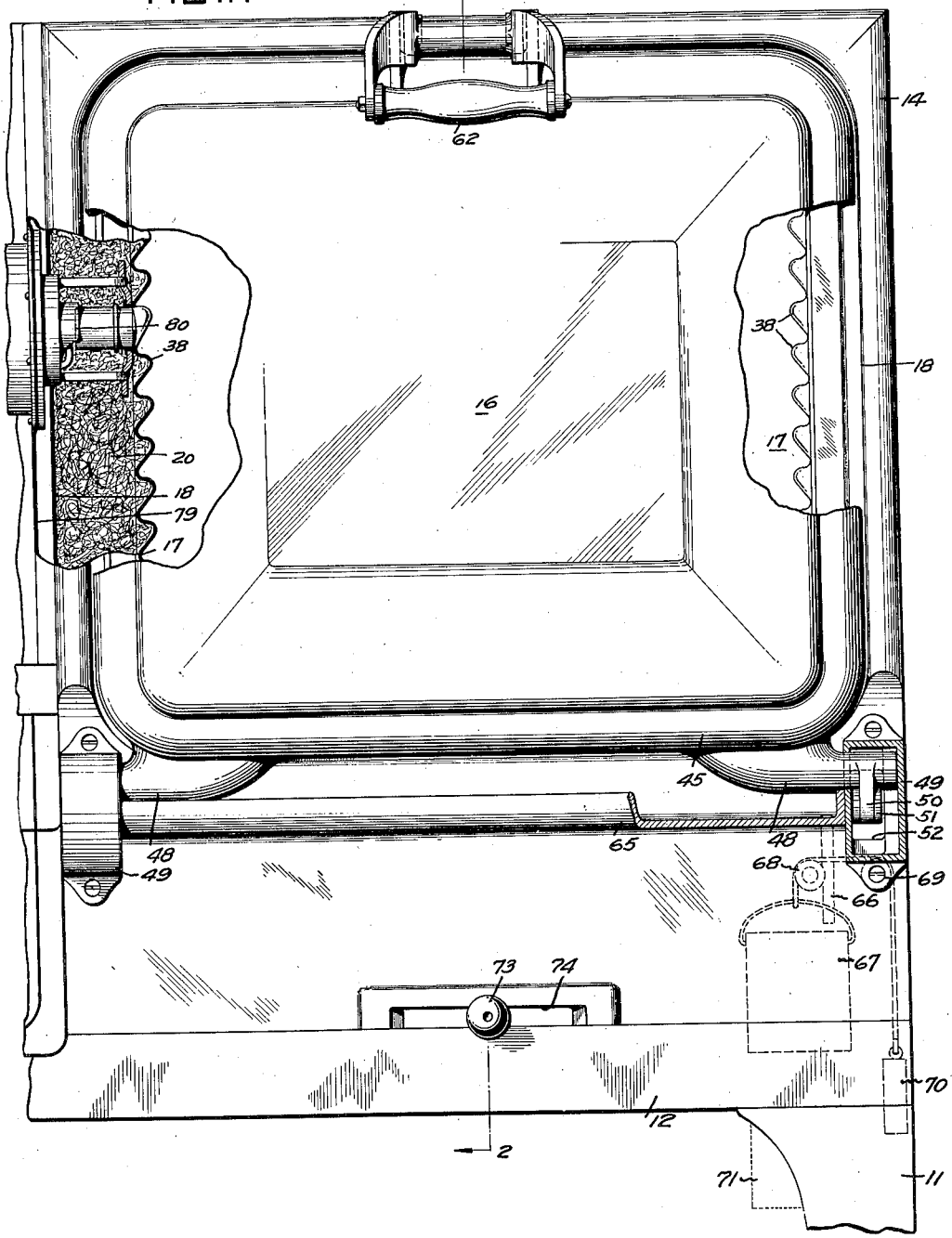

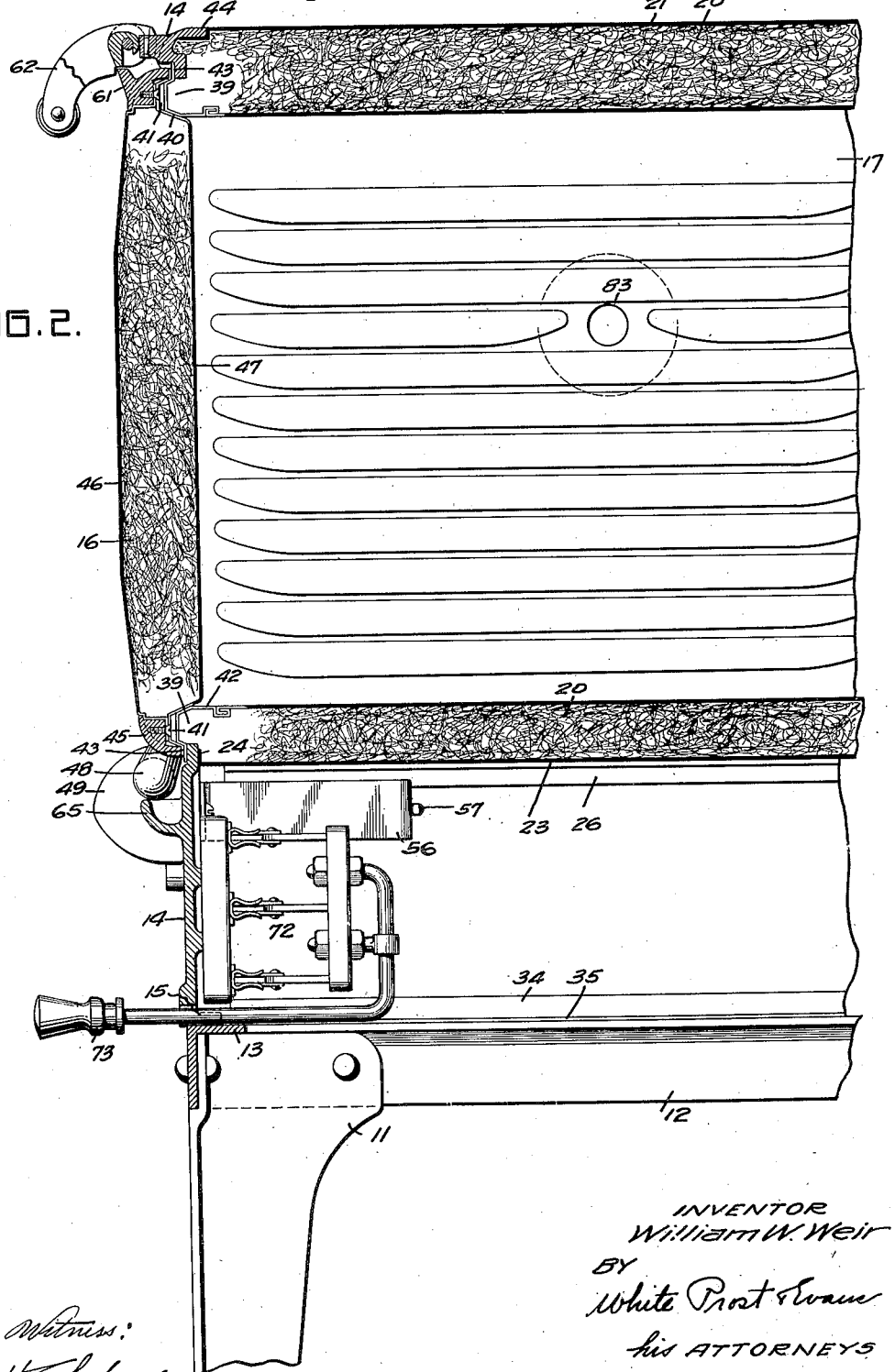

Oct. 26, 1926.       1,604,433
W. W. WEIR
COOKING RANGE
Original Filed Dec. 20, 1923    4 Sheets-Sheet 4
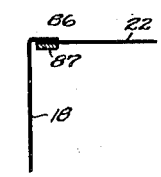
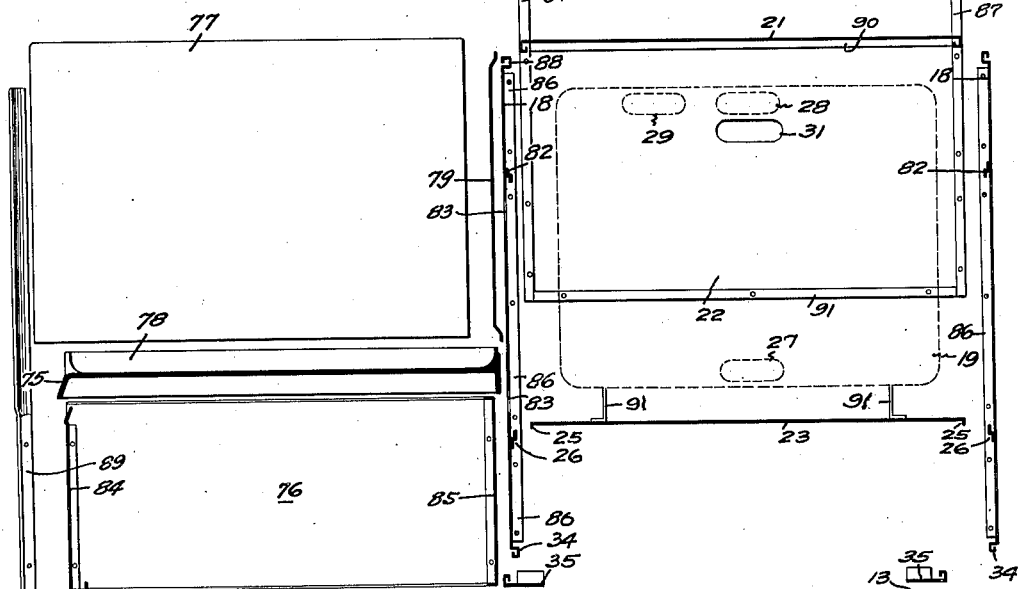
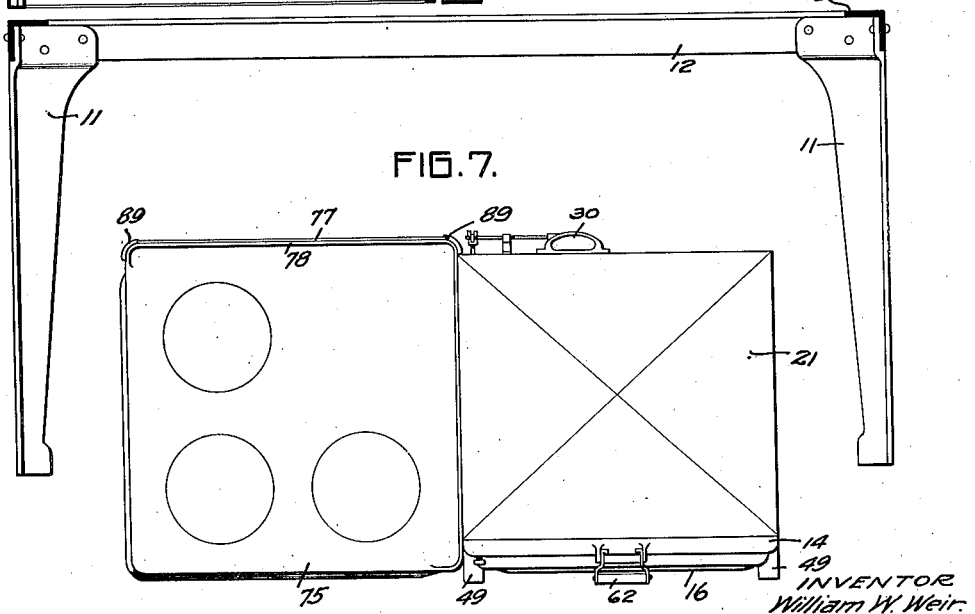
INVENTOR
William W. Weir.
BY
his ATTORNEYS Patented Oct. 26, 1926.

1,604,433

UNITED STATES PATENT OFFICE.

WILLIAM W. WEIR, OF ALAMEDA, CALIFORNIA.

COOKING RANGE.

Application filed December 20, 1923, Serial No. 681,798. Renewed March 22, 1926.

This invention relates to a range, such as is used in the kitchen for cooking and preparing food, and more particularly to such a range that has an oven compartment and the burner plates supported on a common stand and at a substantial height above the floor.

In such ranges, which use either gas or electricity for heating, the oven compartment is most conveniently placed to one side of the burners, and at the edge of the range. It is one of the objects of my invention to make it possible to change the position of the oven from one side of the burners to the other, simply and easily. This I accomplish by the aid of parts specially constructed having this end in view.

It is another object of my invention to provide an improved oven structure that is efficiently protected against heat losses, such as due to radiation and conduction.

It is still another object of my invention to provide an improved door construction for the oven, whereby proper heat insulation even at the edges thereof is maintained.

Still another object of my invention is to provide suitable devices for taking up any drip that may flow from the oven.

It is still another object of my invention to provide an oven structure that is simple to manufacture and of few parts.

Another object of my invention is to improve in general the appearance and construction of ranges of this character.

My invention possesses other advantageous features, some of which, with the foregoing, will be set forth at length in the following description, where I shall outline in full that form of my invention which I have selected for illustration in the drawings accompanying and forming part of the present specification. Although I have shown in the drawings but one embodiment of my invention, I do not desire to be limited thereto, since the invention as expressed in the claims may be embodied in other forms also.

Referring to the drawings:

Figure 1 is a front elevation of a portion of the range, with some of the parts broken away to show the oven structure clearly;

Fig. 2 is a fragmentary cross sectional view of the range taken through the oven;

Fig. 3 is a fragmentary side view of the oven, with the door shown open and in section;

Fig. 4 is an enlarged plan view of the handle and catch device for the oven door;

Fig. 5 is a cross-sectional view of the device used for yieldingly holding the door in closed position, and shows said device in the door closing position;

Fig. 6 is a view of the range, with the main elements shown separated, so as to disclose more clearly how the oven may be changed from right hand to left hand position, and vice versa;

Fig. 7 is a plan view of the entire range, of use in explaining said reversible feature; and Fig. 8 is a detail sectional view of a portion of the oven construction.

The range is shown as supported by the aid of a plurality of legs 11 (Figs. 1, 2, 3 and 6) and an angle iron frame or base 12 forming a substantially rectangular outline, near the corners of which the legs 11 are fastened. The horizontal flange 13 (Figs. 2 and 6) serves as a base upon which the operating parts of the range rest. The oven front frame 14 (shown in section in Fig. 2) has a plurality of feet 15 which rest on this top flange 13, and appropriate fastening devices hold these feet securely in place.

This front frame 14 defines an opening which is arranged to be closed by an oven door 16. The sides, bottom and back of the oven also assist in holding the oven on the frame 12, and are in this instance formed of double walled sheet metal, between the double walls of which appropriate heat insulating material is placed. The sides of the oven are shown most clearly in Fig. 1, in which there are inner side walls 17 separated from the outer walls 18. These inner walls 17, together with the bottom and back plates, form an oven compartment 19, indicated in dotted lines in Fig. 6, around which compartment is packed a layer of insulating material 20. The walls 18 defining the exposed sides of the oven, are removably interlocked at their top edges with the exposed top plate 21, by the aid of the bent-over edges shown clearly in Fig. 6. The back 22 of the oven structure is appropriately fastened to the top plate, in this instance by turning a flange 90 downward at the rear of the top 21, which engages over the top edge of the back plate 22. The exploded view of Fig. 6 shows this flange, and also a stiffening strip 91 where the flange 90 is intended to engage the plate 22. The mode of connection at this rear corner is substantially identical with that at the rear edges of the side plates 18, illustrated in Fig. 8. In this figure the flange 86 of side 18 is lapped over the edge of back plate 22, having the strengthening strip 87. The bottom plate 23 of the oven has a turned-up portion 24 at the front thereof that is fastened to the front frame 14, while at each side it has the turned-down flanges 25 that cooperate with the cleats 26 fastened to the sides 18. At the rear, its mode of fastening to plate 22 is entirely similar to that described in connection with sides 18, and involves the use of a turned-up flange cooperating with the bottom edge of plate 22. A pair of spacers 91 resting on the plate 23 serve to support the back portion of the compartment 19 against drooping. At the front, this compartment is adequately supported by the aid of the front frame 14, as will be described hereinafter.

At the back of the compartment 19 are three elongated openings 27, 28 and 29, the first two of which are used to facilitate connections for electrical leads to the oven elements, and the last for appropriate connection to a draft outlet 30 (Fig. 7). The back 22 is shown most clearly in Fig. 6, as lifted somewhat from its assembled position; and it also has openings 31, 32 and 33 alining respectively with openings 27, 28 and 29.

The bottoms of the side members 18 are fastened as by relatively movable interlocking portions 34, to a pair of strip supports 35 which extend across the frame support 12 and are fastened thereto. To connect or disconnect either of the plates 18 from the top 21 or supports 35, a longitudinal relative movement of the interlocked parts is used, whereby they readily slide out of engagement.

The inner walls 17 of the oven carry horizontal projections or corrugations 38, which serve as guides and supports for the rack that is usually found in ovens of this character. In this way it is unnecessary to provide separate parts for this guide. The corrugations are readily formed by stamping, and are preferably so shaped that they each present a top horizontal surface upon which the rack may rest. The rack can of course be supported by this means at any height in the oven.

I prefer to provide a groove and bead connection between the oven and the door 16. For example, a raised bead or projection 39 (Fig. 2) may be formed all around the oven opening, which fits at least part way into a groove 40 formed in the door 16 near the edge thereof, when the door is in the closed position. Due to the fact that the bead 39 is formed as a prolongation or end of the double wall structure, and that the insulated part of the door 16 covers up the opening of the oven entirely, there can be no substantial heat loss by radiation or conduction. To increase this effect, I prefer to leave a small air space 41 (Fig. 2) between the end of the bead 39 and the bottom of groove 40. This space serves as an additional heat insulating layer.

The bead or projection 39 is formed by the aid of a front sheet member 42 which has a vertical flange 43 extending substantially entirely around the oven, and is overlapped on the edge of the oven opening formed in the front frame 14, as shown most clearly in Fig. 2. However, this flange is not fastened down in any manner to the frame 14, but instead is permitted to have a sliding movement thereon. In this way, the bead 39 is provided with some degree of flexibility, so that it may accommodate itself very accurately to the groove 40 as the door 16 closes. This is very important in order to ensure as perfect a fit as possible for the door, and to conserve the heat properly. The top 21 and sides 18 of the oven are appropriately attached to the edge of frame 14, as by underlapping beneath the flange 44 of the frame.

The door 16 comprises a frame 45 preferably cast, in which are supported the sheet metal parts 46 and 47 defining the double-walled structure. The inner member 47 also forms the groove 40 into which bead 39 enters. The frame 45 is provided with integrally formed hinge pins 48 (Fig. 1) by the aid of which the door 16 is swung on a horizontal pivot. These pins 48 enter into the hollow casings 49 fastened to the front of the frame 14, as shown most clearly in Fig. 3; the casings thus serve as journals for the pins 48.

The door 16 is preferably so yieldingly counter-balanced that it may be rotated to any position about its pivots and left there indefinitely. For this purpose I utilize a compression spring construction which is most clearly illustrated in Figs. 3 and 5. Each of the pivot pins 48 carries an arm 50, at the free end of which a forked clevis 51 is pivoted. This clevis extends toward the rear of the range, there being an aperture 52 in the front frame 14 to pass this clevis. Rotation of the door 16 in a clockwise direction has the effect of moving clevis 51 to the left, and when the door is entirely closed by such movement, the clevis 51 occupies the position of Fig. 5. In the fully open position of Fig. 3 the clevis 51 occupies its extreme right hand position, and at the same time a flat surface 53 of the arm 50 coacts with the edge of the aperture 52 to serve as a limit to the opening movement of the door. The movement of clevis 51 is utilized to affect a compression spring 54, one end of which rests against the plate 55. This plate forms the end of a Z-shaped strap 56 which is fastened to the back of the frame 14, as shown most clearly in Fig. 2. The opening movement of the door serves to compress the spring 54, through the agency of the clevis 51, rod 57 fastened therein and passing through the spring 54, and an abutting washer 58 on the rod 57. The initial compression of spring 54 may be adjusted by the aid of the nuts 59 on rod 57, which nuts serve to limit the movement of washer 58 to the left, and consequently the expansion of spring 54. The tension of spring 54 is so adjusted by adjustment of nuts 59 that the door 16 is substantially counterbalanced in any position.

The door 16 however is preferably so arranged that it may be retained in closed position against shocks or jars. For this purpose the door 16 carries a pair of ears 61 (Figs. 2, 3 and 4) near the top edge which serve to support the handle 62 pivotally. The inner end of handle 62 carries a pair of inwardly projecting hooks 63 adapted to engage the edges of a spring plate 64 fastened to the front of frame 14 near the top thereof, as shown most clearly in Fig. 3. These active edges are substantially perpendicular to the adjacent edge of the oven opening. By rotating handle 62 about its pivot in an upward direction, the hooks 63 are caused to engage these edges at their inner surface, and in this way the door 16 may be securely held in place. A reverse movement of handle 62 causes a disengagement between the locking parts, and the door may be opened. The spring plate 64 serves the very useful purpose of taking up any slight tendency to looseness in the door mechanism.

It frequently occurs that food is cooked in the oven that produces moisture, as by condensation. This is especially apt to happen in electric ranges, where the oven is very carefully heat insulated as shown in the present instance. This is likely to occur also when opening and closing the oven door. The groove 40 formed around the edge of the door to accommodate the projection 39 of the oven, serves conveniently as a trough for collecting this moisture. A trough 65 (Fig. 2) is also formed on the front of the frame 14, just below the lower edge of the door, so as to catch the drip from the groove 40 as the door is closed. A drain pipe 66 (Fig. 1) leads from the bottom of the trough 65 to a vessel 67. This vessel is suspended from pulleys 68 and 69, supported on the back of frame 14, and is counterbalanced by a weight 70. This weight is such that when the vessel 67 is full, the weight permits the vessel to fall to the position indicated at 71 in Fig. 1, and thus become visible. This is an indication that the vessel needs emptying.

A double-throw switch 72 is indicated in a general way in Fig. 2, beneath the oven compartment and behind the frame 14. Such switches are useful in electric ranges to connect either the electric range or a water heater to the system, but not both. In this way excessive load demands are prevented. The switch handle 73 projects through a slot 74 in the frame 14, whereby it may be readily manipulated from the front of the range.

Referring to the diagrammatic Figs. 6 and 7, it is seen that one side of the range is taken up by the oven structure, and the other side, by an apertured burner plate support 75. This plate carries either the gas burners or the electrically heated hot plates. It is spaced above the frame or base 12 by the aid of the sheet metal box-like structure 76. This structure is appropriately fastened at its top and bottom respectively to the support 75 and the frame 12. A backing sheet of enamelled metal 77 rests on angle supports 89 fastened at the rear corners of the structure 76 and supplementing the upturned rear edge 78 of the support 75. By the aid of these supports the plate 77 is fastened in place. An enamelled splash plate 79 is provided on that side of the oven which is next to plate 75. This splash plate is also shown in Fig. 1. It is supported away from the oven side 18 at its bottom by supports similar to that for plate 77, and at its top by the oven side 18. An indicating thermometer 80 is supported on this splash plate 79, as shown in Fig. 1, and extends through apertures in the oven side so as to be exposed to the internal oven temperature. The particular thermometer illustrated operates on the principle of gas pressure produced by a volatile fluid, and is described in detail in my copending application entitled: Temperature responsive device, filed concurrently herewith and having Serial No. 681,795.

The open end of the sheet metal compartment is made use of to accommodate the various controlling switches for the electrical elements. These switches and support are shown in outline at 81, Fig. 3; they cover up the opening beneath plate 75 and are readily accessible for quick manipulation.

It is highly desirable at times to change the oven structure from the right hand side, as illustrated, to the left hand side of the range. This requirement may in fact occur on ranges already installed or about to be installed. My invention readily takes care of this condition, for all that is required is the unfastening of some screws or bolts that hold parts 35 and 76 to the supporting frame 12, and to rearrange the various parts as will now be described. The oven compartment 19 is left undisturbed on the plate 23. The position of the thermometer 80 is changed to the right of the oven, and in order to provide an aperture therefor, the sides 18 are interchanged, by sliding them out of engagement with the interlocked joints of parts 35 and top 21, after unfastening the rear edges of the sides from the top plate 21 and rear plate 22. These sides 18 are reversed, top for bottom, but are not reversed as regards front and back. The left hand plate 18 is provided with two apertures 83, one of which in either position of this plate is in proper position to accommodate the thermometer 80. In order to take care of the support for plate 23, extra supports 82 are provided on these sides, which when reversed, take the place of the supports 26. The splash plate 79 is also reversed. The top of this splash plate interlocks in the part 88 of the side plate 18, whereby it is supported at that place. The two apertures 83 in the side plate 18 at the left permit reversal and yet allow the thermometer 80 to be inserted from that side of the oven which is next the burner plates. The unused apertures in the oven 19 and side 18, if visible, are covered with plates that may readily be removed.

As thus far described, it is readily seen that the oven compartment may be shifted bodily to the left, and refastened again to the top of frame 12 by the aid of screws or bolts and apertures provided in the top of frame 12. To take care of the reversal of the burner support 75, the back edge and the right hand edge are made substantially alike. Now when the plate is moved to the right, the entire support 75 is rotated one fourth of a turn in a counterclockwise direction, bringing the back edge to the left, next to the new position of the oven, and the right hand edge to the back. Of course this requires a substantially square member 75. The position of the compartment 76 is also changed, by interchanging the two sides 84 and 85, to which the edges of plate 75 are fastened. The back plate 77 is also removed and replaced after the support 75 is shifted as described.

I claim:

1. In a cooking range, a supporting base, an oven supported on top of the base at one side thereof, a burner support at the other side of the base, and a back plate supported on the burner support at the back edge of this support, said burner support having its back and one of its side edges substantially identical in form whereby either of these two edges may fall at the back of the range to support the back plate, depending on which side the oven is located.

2. A cooking range having a supporting base, an oven supported on top of the base at one side thereof, a burner support at the other side of the base, and an indicating thermometer supported at one side of the oven and projecting therein, the oven having sides and a top and bottom which removably engage with each other, whereby the position of that side through which the thermometer projects may be changed when the position of the oven on the base is changed from one side to the other.

3. In a cooking range, a supporting base, an oven supported on top of the base at one side thereof, a burner support at the other side of the base, a back plate supported on the burner support at the back edge of this support, said burner support having its back and one of its side edges substantially identical in form, whereby either of these two edges may fall at the back of the range to support the back plate, depending on which side the oven is located, and an indicating thermometer supported at one side of the oven and projecting therein, said oven having sides removably engaging with the top and bottom plates of the oven, so that the position of the thermometer may be changed by interchanging the side plates.

4. In a cooking range, a supporting base, an oven supported on top of the base at one side thereof, and a thermometer extending into the oven, said oven having side plates and top and bottom plates, said side plates being removably connected with the top and bottom plates, and having removable extensions fastened to the top of the base, whereby the side plates may be interchanged, one of said plates having a pair of openings to accommodate the thermometer at either side of the oven, depending upon the position of the apertured side with respect to the oven.

5. In a cooking range, a supporting base, an oven supported on top of the base at one side thereof, a thermometer extending into the oven, said oven having side plates and top and bottom plates, said side plates being removably connected with the top and bottom plates, and having removable extensions fastened to the top of the base, whereby the side plates may be interchanged, one of said plates having a pair of openings to accommodate the thermometer at either side of the oven, depending upon the position of the apertured side with respect to the oven, a burner support on the other side of the base, a back plate supported on the burner support at the back edge thereof, said burner support having its back edge and one of its side edges formed substantially identically, whereby either may be located at the back of the range while the other falls along-side the oven, and a splash plate supported on the edge nearest the oven.

6. In an oven construction for a cooking range, a double walled oven compartment, and a double walled door for said compartment, said door and compartment when closed having a groove and bead interlocking engagement near the edges of the door, the bead being slightly spaced from the bottom of the groove.

7. In an oven construction for a cooking range, an oven compartment, and a door for said compartment having a groove near its edge, whereby a drain for the oven is provided.

8. In an oven construction for a cooking range, an oven compartment, a door for said compartment having a groove near its edge, and means forming a trough for catching the drip from the groove in the door.

9. In an oven construction for a cooking range, an oven compartment, a door hinged at its lower horizontal edge for said compartment, said door having a groove near its edge adapted to cooperate with the edge of the oven compartment, and means forming a trough below the lower edge of the door.

10. In an oven construction for a cooking range, an oven compartment, a door hinged at its lower horizontal edge for said compartment, said door having a groove near its edge adapted to cooperate with the edge of the oven compartment, means forming a trough below the lower edge of the door, and a vessel for catching the drip from the trough.

11. In an oven construction for a cooking range, a front frame having an aperture, an oven compartment opening into the aperture, a door pivoted near its lower horizontal edge for closing the aperture, said door having a groove near its edge for cooperating with the edge of the compartment, means on said frame forming a trough below the door, a vessel for collecting the drip from the trough, a pulley supported on the back of the frame for suspending the vessel, and a counterweight for the vessel whereby as the vessel is filled, it is permitted to sink to a position where at least a part thereof is visible.

12. In an oven construction, a container, outer walls for said container forming a double walled construction therewith, and having an opening, near the edges of which the outer walls are fastened, means forming a bead at the open edge of the container, said means being of resilient sheet metal and overlapping the edges of the opening in the frame but not connected thereto, whereby said bead is provided with flexibility, and a door for the open side, having a groove cooperating with the bead.

In testimony whereof, I have hereunto set my hand.

WILLIAM W. WEIR.